Oct. 30, 1962 G. J. KREIER, JR 3,061,500
METHOD OF MAKING PLASTIC BAS-RELIEFS
Filed April 1, 1960 2 Sheets-Sheet 1
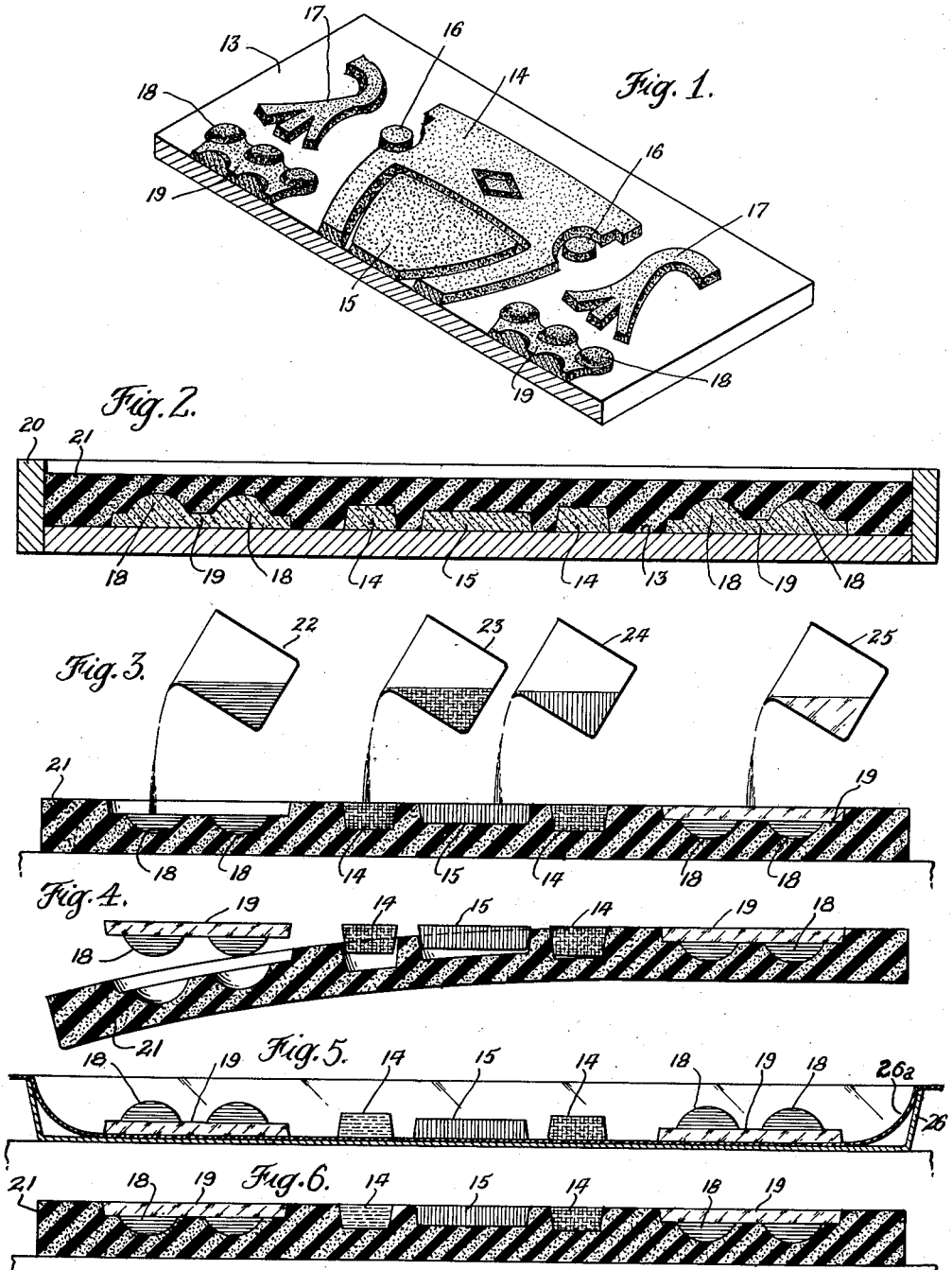
INVENTOR
George J. Kreier Jr
BY
ATTORNEYS Oct. 30, 1962  G. J. KREIER, JR  3,061,500
METHOD OF MAKING PLASTIC BAS-RELIEFS
Filed April 1, 1960  2 Sheets-Sheet 2
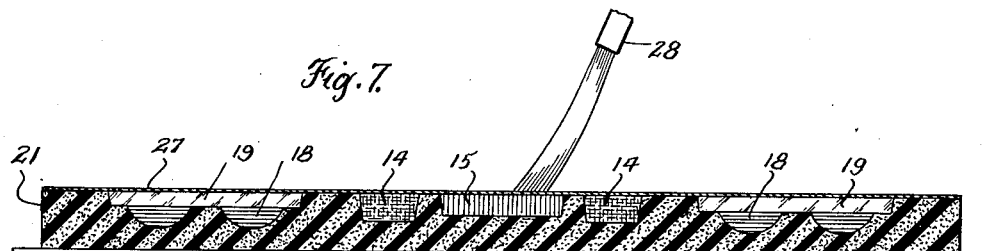
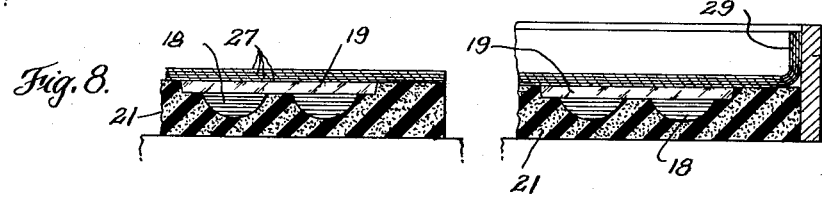
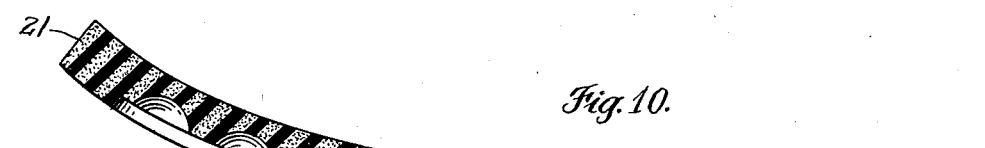
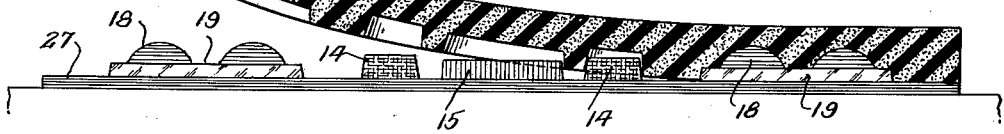
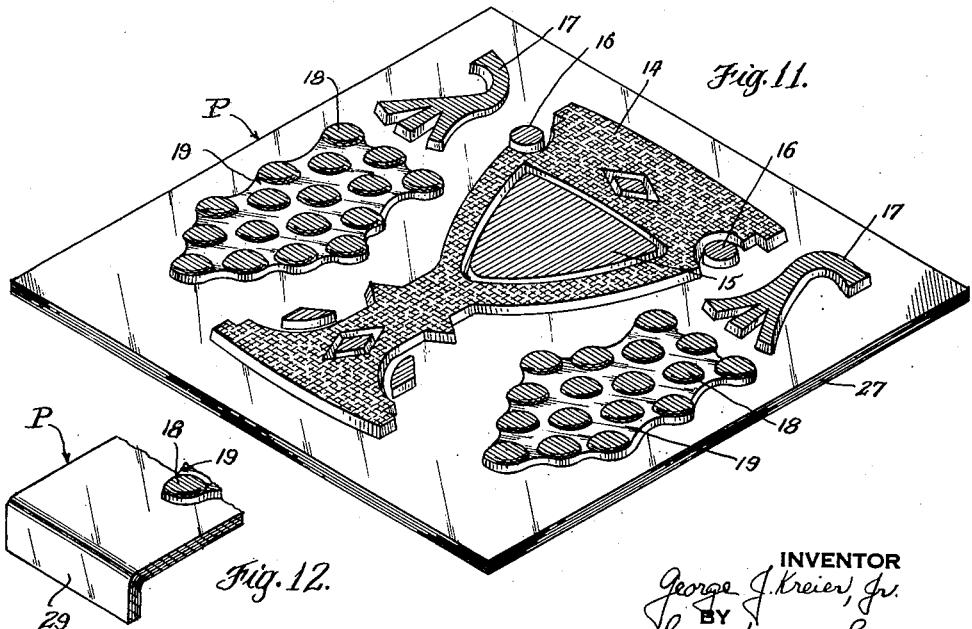
INVENTOR
George J. Kreier, Jr.
BY
Shunestvedt + Lechner
ATTORNEYS United States Patent Office 3,061,500
Patented Oct. 30, 1962

3,061,500
METHOD OF MAKING PLASTIC BAS-RELIEFS
George J. Kreier, Jr., 1524 Cambridge St., Philadelphia 30, Pa.
Filed Apr. 1, 1960, Ser. No. 19,401
4 Claims. (Cl. 156—245)

This invention relates to sculptured, color-patterned plastic panels, i.e., panels in low or bas-relief, and is concerned with the production of a novel article of this kind as well as with a method for manufacturing it.

Before stating the objects of the invention, it will be helpful to point out that in modern architecture the solid wall is becoming progressively a smaller percentage of the surface area of a building. For instance, with present day media, large areas can embody translucent or transparent materials which require no more strength than that which is necessary to support themselves and withstand wind loading. In other words, modern structures are being designed to embody an ever increasing area of glass or plastic. Furthermore, there is a steadily increasing demand for the enrichment of such areas in terms of both color and pattern.

The present invention has for its primary object the provision of plastic panels in which it is possible to attractively combine colors and patterns in low relief in an essentially planar form as well as a method for manufacturing such panels. It is also an object of the invention to produce such panels in richly translucent materials that are highly resistant to breakage and deterioration and which at the same time have reasonably effective heat insulating qualities. Another object is to produce panels of the character described which can be made of any desired size, within reasonable limits of course, and at very moderate cost.

The invention also has in view the manufacture of such panels by means of a technology which makes them economically feasible for use in the construction of buildings or other enclosures calling for large areas of translucent or transparent materials.

While the invention is in no sense to be considered as an imitation of stained glass, yet it provides for exceedingly rich and brilliant effects under changing daylight or artificial illumination. Indeed, one of the objects of the invention is to permit a much freer use of translucent or transparent materials than is practical with stained glass—this objective being attainable because the invention makes it possible to provide for the desired effects by means of panels which do not have the serious mechanical limitations characteristic of stained glass. Furthermore, the panels of the present invention can be produced without the great expense associated with the manufacture and installation of stained glass.

Probably the most important aspect of the present invention is found in its ability to provide enrichment of the visual effect of translucent or transparent areas by the embodiment in such areas of colored patterns in low or bas-relief—something which has not been possible heretofore insofar as I am aware.

In attaining all of the foregoing objectives I prefer to employ light stabilized polyester resins as the plastic material from which my novel panels are manufactured although it is quite possible to use other resins in attaining my objectives.

How the foregoing objects and advantages, together with such others as may appear hereinafter or are incident to the invention, are attained is illustrated in preferred embodiments in the accompanying drawings, wherein FIGURE 1 is an isometric projection of a portion of a model such as is used in carrying out my invention;

FIGURE 2 is an enlarged sectional view illustrating the manner in which the model of FIGURE 1 is employed in preparing a mold for use in carrying out my invention;

FIGURE 3 is a section through the finished mold illustrating the manner in which the depressed areas produced by the sculptured or raised portions of the model are filled with liquid resin;

FIGURE 4 illustrates a step in the preferred method which I have developed involving removal of the hardened resin pieces from the mold;

FIGURE 5 illustrates another of the steps in my preferred process, namely, placing the resin pieces which are removed from the mold into a pan so that they can be baked to complete the shrinkage of the pieces;

FIGURE 6 illustrates the next step in my preferred process, namely, return of the baked pieces to the mold for completion of the manufacturing procedure, the mold now functioning as a jig fixture;

FIGURE 7 illustrates the mold with the shrunken pieces in position over which a layer of fiber mat material has been placed and showing how additional liquid resin may be applied over the back of the assembly as by means of a brush;

FIGURE 8 is a partial section similar to that of FIGURE 7 showing how a plurality of layers of fiber mat material and applied liquid resin can be built up on the sculptured resin pieces;

FIGURE 9 is a view similar to that of FIGURE 8 but showing the manner in which a strengthening flange can be applied at the back of the panel;

FIGURE 10 illustrates the step of separating the finished panel from the mold;

FIGURE 11 is an isometric projection similar to that of FIGURE 1 but illustrating the finished panel made as a replica of the mold of FIGURE 1; and FIGURE 12 is a view of the lower corner of a panel according to FIGURE 11 but including also a rearwardly extending flange for increasing its structural strength.

I will now describe the preferred method by which I manufacture the panels of my invention. As a first step, a model of the desired panel in bas-relief is prepared. This model may be made of any suitable material by employing techniques which are well established in the art of making models. For example, the model may be made from water clay, plasticene, plaster of Paris, carved wood, etc. Such a model is illustrated in FIGURE 1 although it should be noted in this connection that only a portion of the model is shown because a complete panel made from the model is illustrated in FIGURE 11. The modeling plane is indicated by the reference character 13 and raised portions of various heights may be formed thereon to produce the sculptured pattern or bas-relief desired. For instance, the outer shield-like portion 14 may be of one height with an inner portion 15 of slightly less height. The small areas 16 at each side are preferably of the same height as the portion 14 while the central area 15 may be of less height. The fork-like members 17 may be of still another height if desired although I have shown them as being equal in height to the portion 14.

The clusters in the lower corners include ball-like areas 18 which are in still higher bas-relief and will be referred to as grapes and these are delimited or defined by a lower area 19.

It will be seen from the foregoing that a sculptured pattern in low relief, otherwise known as a bas-relief, has been produced and, at this point, I would like to say that in determining upon a pattern a discipline of art or design must be observed in order to realize fully the potentialities of my process. The artist working in bas-relief or sculptured patterns will be fully aware of what is required in this connection because the ultimate visual effects desired, in relation to the technical limitations of the process, understandably, will determine what may be modeled. For instance, where colors are introduced, the models for the color pattern must define, on the modeling plane, the areas which are to consist of specific colors and these areas must then be sculptured in such a way as to represent the final surface of the resin in which they well be cast, as will further appear. Each color must be separated from the adjoining color by a groove which returns to the neutral plane and, in my work, I have found that a very useful width for this groove lies between 1/8" and 1/4". Bas-reliefs so built up consist of raised areas disposed upon the normal plane in the pattern desired. Of course, the areas between the raised areas may themselves vary in width as part of the design. Indeed, in a single model there may be a variety of normal planes. However, all normal planes in a single model ordinarily will lie parallel to one another.

Following the step of preparing the desired model a mold is made from the model. According to my preferred technique these molds should be made of any flexible material which is capable of use in the casting of the resin from which the panel proper is to be made. In the molding system which I prefer a cold set synthetic polymer having the least inhibiting effect upon the resins selected for the panel is employed. The material which I have found to be most eminently satisfactory for this purpose is a cold setting synthetic rubber molding system such as that which is sold by the Perma-Flex Mold Company of 1919 East Livingston Avenue, Columbus 9, Ohio. It is designated by this company as "Perma-Flex CMC" and is represented to be a polymercaptan base synthetic and is furnished in three separate ingredients which are mixed together at the time of use. As stated, this is the molding system which I prefer but alternate materials and methods for preparing elastic molds may be adopted such, for example, as those which include the use of animal glues, natural latexes, vinyls, and silicone rubber materials.

It will be understood, of course, by those skilled in this art, that whatever material is chosen for the mold involves the selection of suitable modeling material as well as suitable mold parting agents and finally the employment of compatible resins in the preparation of the panel. Molding materials of the various kinds to which I have made reference are known to those skilled in the art so they need not be described herein in further detail. It should be noted, however, that with my preferred technique, as will further appear, a molding material which will produce a flexible or elastic mold is generally essential, especially in the preparation of bas-reliefs having substantial depth of pattern or intricacy of design. This is particularly true in the case of the polyester resins which are the resins I prefer to employ in the manufacture of my novel sculptured panels. The polyester resins are subject to shrinkage but their general characteristics, their ready availability and their relatively low cost render them especially well suited for the purposes of my invention. There are other resins which do not shrink or at least shrink very little during the hardening step and if such are employed it is sometimes practical to utilize a mold which is not flexible, although by and large, to a full realization of my invention, a flexible mold is necessary because it permits the greatest possible freedom of execution both artistically and technically.

In making the mold various procedures may be followed and in FIGURE 2 I have shown the model with a dam 20 surrounding it in order to hold the liquid mold material until it has set to produce the mold 21 which, in my preferred practice, is a polymercaptan base synthetic as mentioned above. The model, of course, is placed in position upon a suitable support with the elevated areas forming the bas-relief facing upwardly as shown in FIGURE 2 and with the dam 20 of sufficient height to provide a reasonable depth of mold material over the highest points in the bas-relief.

After the mold material has been poured and setting thereof has been completed it is, of course, separated from the model and is then ready for the further steps of the process.

The finished mold is placed in the position indicated in FIGURE 3, namely, with the recessed portions (corresponding to the high points on the bas-relief) facing upwardly in position to receive the liquid resin which will form the panel.

The surface of the mold 21 is first properly prepared with suitable parting agents in a manner which will be well understood by those skilled in this art, after which the pouring of the resins takes place. By way of example, water soluble waxes and polyvinyl alcohol films are well adapted for use as parting agents because they will prevent chemical interaction between the mold and the resin. Those skilled in the art will recognize others which may be similarly suitable.

FIGURE 3 shows a series of four beakers above the mold each of which may contain liquid resin of a different color or with one or more of them containing resin which is transparent or translucent. Whether translucent, transparent or colored will, of course, be determined by the nature of the design. By way of example only it will be assumed that the beaker 22 contains a blue resin as indicated by the hatching. This is poured into the deeper recesses 18 which form the grapes of the pattern. The beaker 23 may contain a liquid resin of yellow color, as shown by the hatching and this is poured into the depressions which are formed by the portions 14 of the model. The third beaker 24 may contain a red resin which is shown as being poured into the recesses formed by the portions 15 of the bas-relief. The fourth beaker 25 may contain a clear or translucent resin of a neutral color and is shown as being poured into the recess created by the portion 19 of the mold.

The foregoing, of course, are merely examples because any color combinations desired can be utilized depending upon the effect which the artist wishes in the finished panel. Furthermore, multiple layers of differently colored resins can be employed to produce richly varied effects and when this is done a cavity or recess is first partially filled with resin of one color which is permitted to gel after which resin of another color is superimposed on the first, etc. The color of the light which passes through such layers, naturally, will be a composite of the colors making up the layers.

After pouring, the resins are allowed to polymerize and according to my preferred practice, especially where resins involving shrinkage are involved, the individual pieces are withdrawn or separated from the mold as indicated in FIGURE 4, in which figure the mold 21 is shown in the left hand side of the figure as being bent downwardly away from the pieces. This illustrates one of the reasons for employing a flexible mold.

The pieces so withdrawn from the mold are then placed upon a tray or pan 26 as diagrammatically illustrated in FIGURE 5. It is useful to set them upon a sheet of cellophane 26a in order to prevent sticking to the pan as well as to facilitate subsequent handling. The tray itself, of course, is not essential to the invention but it provides a convenient way in which the pieces may be handled for introduction into an oven where they are baked until final shrinkage has been accomplished. The shrunk pieces are then returned to the mold which now acts as a jig fixture to hold them in proper position during the final steps of my process. This is illustrated in FIGURE 6. In this operation the flexibility of the mold is again of importance because it allows the pieces to be seated regardless of shrinkage or slight distortions that may occur in complex shapes.

A fiber mat material 27, preferably fiber glass, is now placed over the mold with the pieces in place as shown in FIGURE 7. This fiber mat will then cover the mold and the pieces and liquid resin is then applied over the surface. This application is preferably done by a brushing operation rather than a pouring operation and a brush 28 is indicated for the purpose. The reason for the brushing procedure is that it gives better control of the quantity of resin which is applied to the surface. It should be sufficient to permeate the fibers of the mat and come into contact with the upper surface of the replaced pieces, but it should not be sufficient to work its way down into the recesses in which the pieces are resting. The operation just described should substantially saturate the fiber material and effect a bond between this material and the individual pre-cast and pre-shrunk elements which are resting in the mold.

A series of layers of mat material 27 are preferably applied one after the other with suitable hardening of the previously applied resin before the next mat is added to the layer. The number of layers of mat 27 and resin which should be used will be determined by the strength desired in the final structure. Sometimes only a few layers are necessary while in others many layers may be employed. The use of a plurality of layers is roughly shown in the fragmentary view of FIGURE 8.

Additional rigidity can be given to the panel by providing its edges with a rearwardly projecting flange 29. This is accomplished by placing a frame 30 around the mold as shown in FIGURE 9. The fiber mat material is extended upwardly against the frame and the resin is brushed over this flange as well as over the horizontal area of the panel as shown in FIGURE 9. As will be understood, the provision of such a flange 29 will give additional strength and rigidity to the panel. In this way any tendency toward warping can be better controlled and it also facilitates installation of the panels.

After the resin which was applied to the back of the panel has been sufficiently cured, the mold and the panel may be separated as shown diagrammatically in FIGURE 10. Here the flexible mold is again of particular advantage because it can be bent away from the panel as indicated in the figure and this capability greatly facilitates separation of the mold and the panel.

After stripping the mold from the panel a resin coating may be applied to either or both surfaces of the finished panel or the panel may be used as it comes from the mold depending upon individual needs or preferences. In addition, post curing may be employed depending upon the resin system which may have been used in producing the panel.

The finished panel P without a rearwardly extending flange is shown in FIGURE 11 while in FIGURE 12 a corner of a similar panel is illustrated having a rearwardly extending flange 29 as already described.

From the foregoing description it is believed that the many advantages made possible by the invention will be clearly apparent but it might be useful to summarize them somewhat as follows, especially since a great deal depends upon the artist who is using the process. For example, the development of facets to deflect and reflect the light must be carefully considered in order to make the fullest possible use of the technique. Proper development of the profiles and contours can contribute much to the decorative effect. The depth of the sculpture or bas-relief likewise has a marked effect because it will control the amount of light which is transmitted. The margins between the individual colors of the pattern will also play an essential part in the visual effect produced. Such margins can provide clear spaces which separate the colored areas and provide a halo of brilliant illumination about the design, especially under certain lighting conditions. Unlike stained glass which uses the black line to separate colors, my invention employs the brilliance of light between the colors as a large element in the artistic and esthetic effect produced. It will be seen therefore that a proper balancing of the clear areas against the colored portions of the design will play an important part in realizing to the fullest extent the variety and richness of the effects which the artist can produce with the invention.

It will also be obvious that some designs may employ areas of opaque colors if such be desired in the attainment of a special decorative effect. Obviously such opaque areas can be created by using the same technique merely by substituting an opaque resin for a translucent resin.

I wish to call attention to another factor and that is one which relates to the material used in preparing the mold. I have indicated a preference for a polymercaptan base synthetic, but other molding materials may also be useful if the polymers selected have substantially no inhibiting effect upon the resins which are to be employed in the panel. For example, as known to those skilled in the art, certain mold materials may prevent the resins from drying properly. Such an inhibiting effect should be avoided. Furthermore, mold materials should be selected which will produce the clearest and cleanest castings. Mold coatings can also be employed if so desired.

With respect to the resins employed they should also be considered from the standpoint of their compatibility with the mold system. I have suggested the polyester resins, but others might well be employed if proper consideration is given to the associated mold system. It is also important that the resins employed are catalyzed resins, i.e. resins which include a promoter or activator which will insure transition from the liquid to the polymerized stage. Such catalyzed resins, of course, are well known to those skilled in the art.

I have indicated my preference for polyester resins and fiber glass in the construction of my panels because, among other things, they afford an economy not attainable with other combinations. Nevertheless, other resins may be employed such as the epoxy resins. The epoxies will upgrade the strength of the panel. In other instances acrylic polymers may be employed.

It will be obvious from all of the foregoing that the essential features of my invention as defined in the accompanying claims can be attained by employing various media and that any one medium that may be chosen will, of course, have a bearing upon the others which may be used therewith.

I claim:

1. The method of manufacturing plastic panels in bas-relief which includes the steps of preparing a model of the desired pattern, said model having a modeling plane with the desired pattern in bas-relief projecting outwardly from said plane, making a mold from the model, positioning the mold with the depressed areas created by the raised portions of the bas-relief of the model facing upwardly, pouring liquid polymerizable resin into depressed areas of the mold, hardening the resin to form individual pieces in depth, removing the hardened pieces and baking them until shrinkage is complete, replacing the hardened pieces in their respective places in the mold, laying a fiber binding mat over the mold and the replaced pieces, applying liquid polymerizable resin over the mat, permitting the resin to permeate the mat and harden in situ against the pieces whereby to unite the whole into an integral panel, and separating the panel and the mold.

2. The method of claim 1 wherein the mold is flexible.

3. The method of claim 1 wherein a plurality of layers of mat and resin are applied with hardening of each layer whereby to build up the desired structural strength.

4. The method of claim 2 wherein a plurality of layers of mat and resin are applied with hardening of each layer whereby to build up the desired structural strength.

References Cited in the file of this patent

UNITED STATES PATENTS

| | | |
|---|---|---|
| 2,817,619 | Bickel et al. | Dec. 24, 1957 |
| 2,880,492 | Johnson | Apr. 7, 1959 |

FOREIGN PATENTS

| | | |
|---|---|---|
| 552,035 | Belgium | Nov. 14, 1956 |
| 1,127,910 | France | Aug. 20, 1956 |
| 1,129,003 | France | Sept. 3, 1956 |